Oct. 9, 1962 P. H. DIXON 3,057,514
MECHANISM FOR HANDLING WORKPIECES
Filed April 14, 1958 4 Sheets-Sheet 1
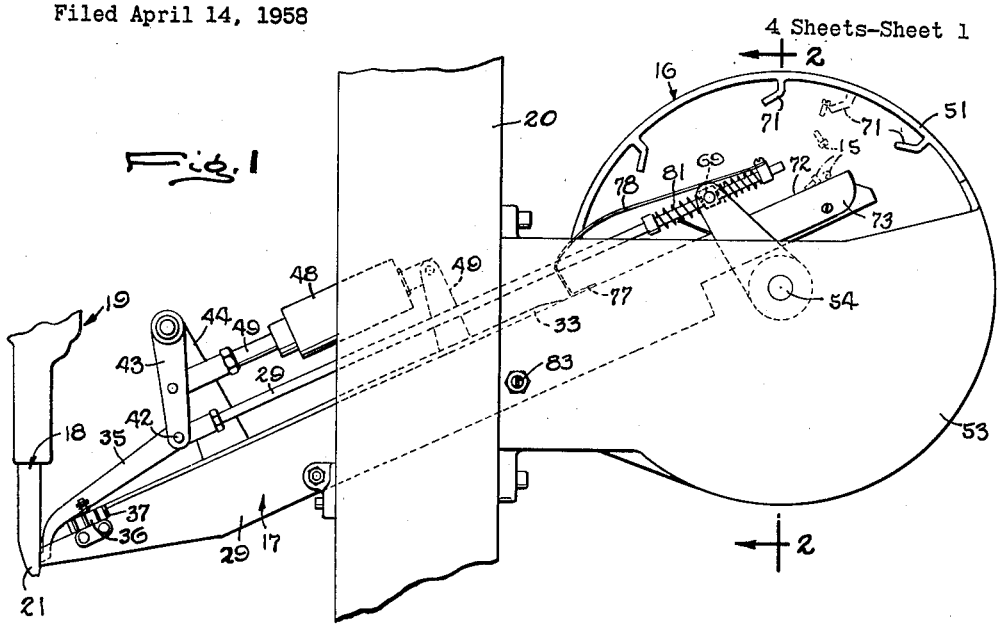
INVENTOR
Paul H. Dixon
ATTORNEY

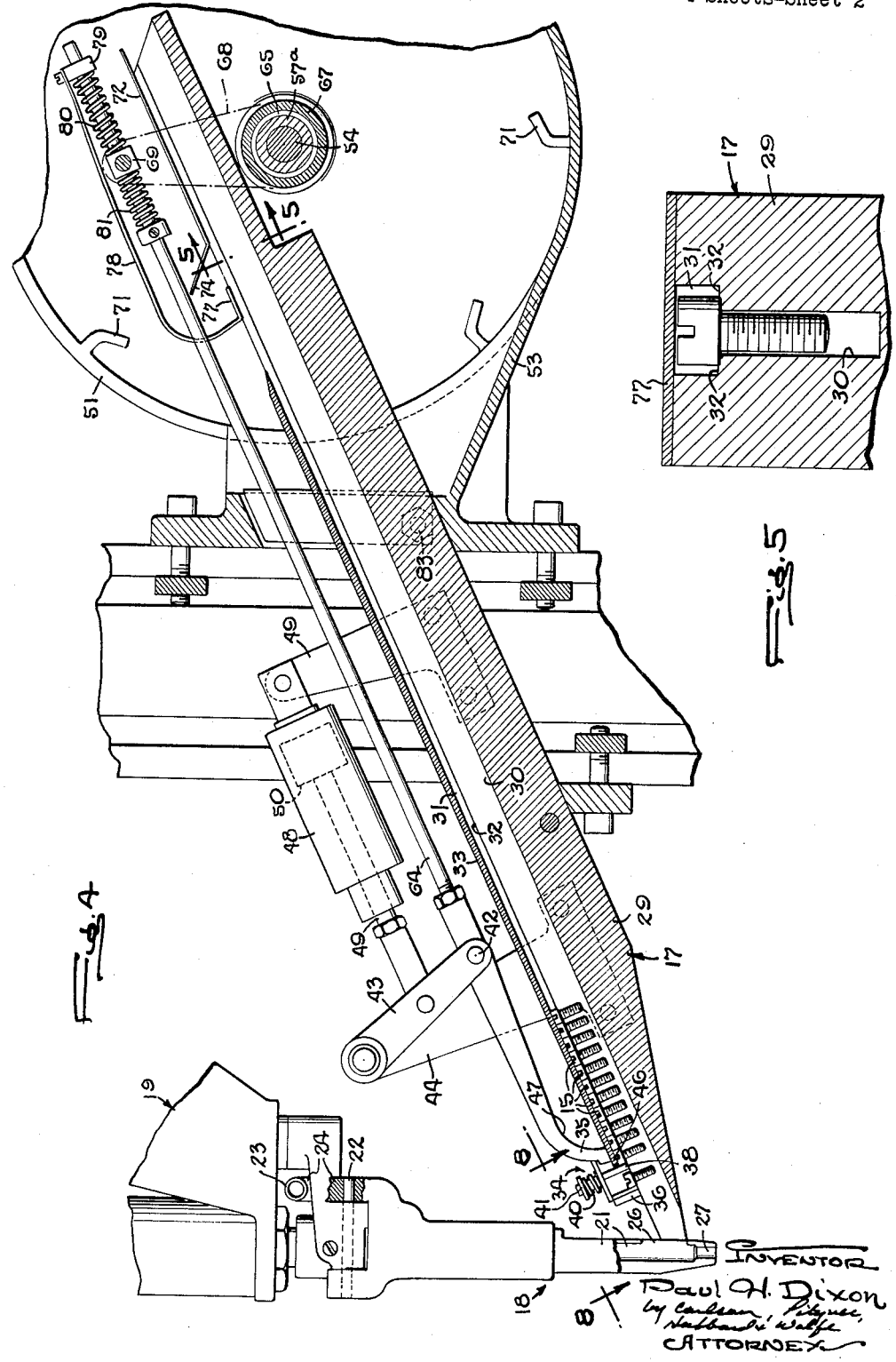

Oct. 9, 1962 P. H. DIXON 3,057,514
MECHANISM FOR HANDLING WORKPIECES
Filed April 14, 1958 4 Sheets-Sheet 3
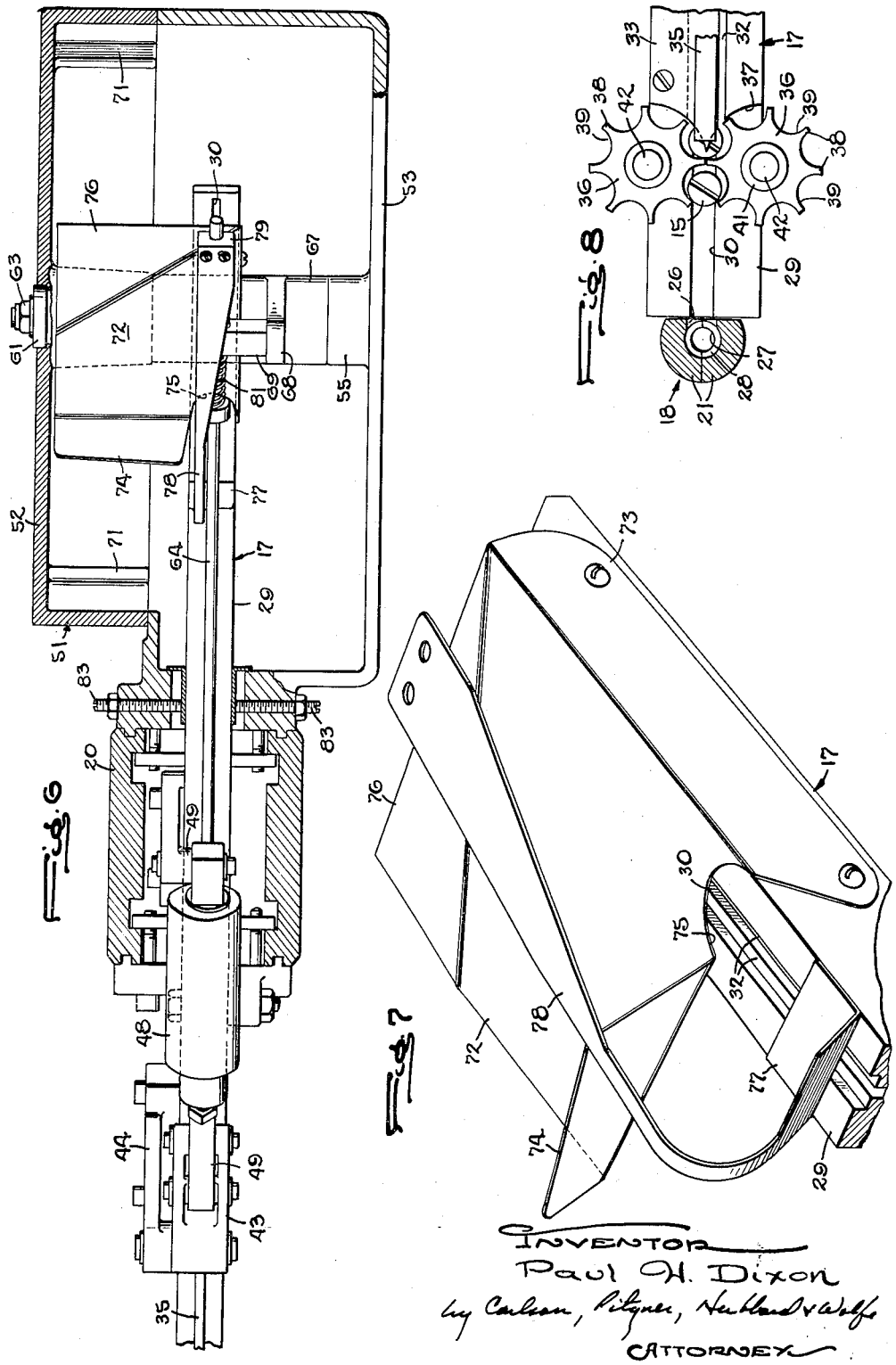
INVENTOR
Paul H. Dixon
by Carlson, Pitzner, Hubbard & Wolfe
ATTORNEY

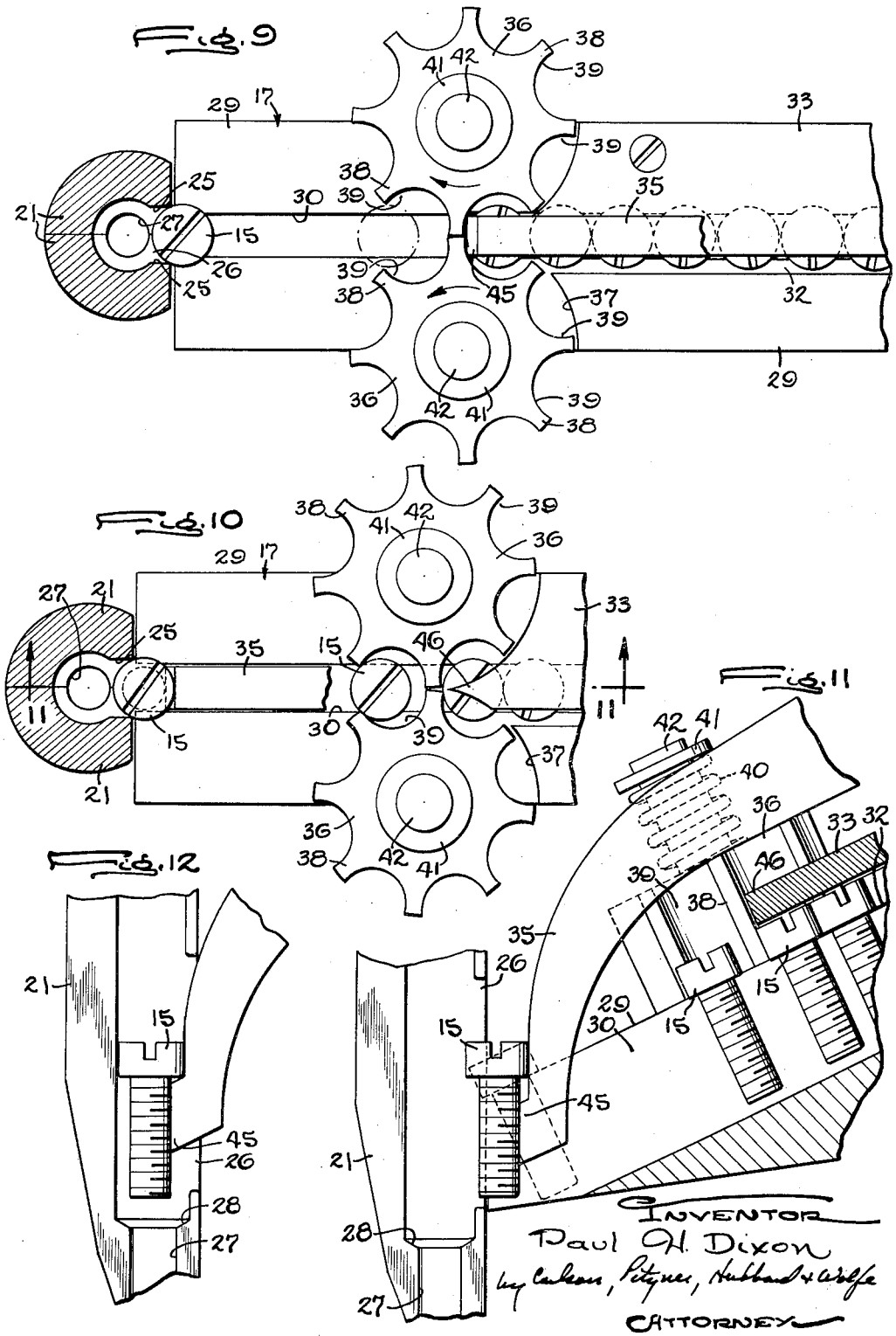

United States Patent Office 3,057,514
Patented Oct. 9, 1962

3,057,514
MECHANISM FOR HANDLING WORKPIECES
Paul H. Dixon, % Dixon Automatic Tool, Inc.,
2300 23rd Ave., Rockford, Ill.
Filed Apr. 14, 1958, Ser. No. 728,143
4 Claims. (Cl. 221—179)

This invention relates to machine tools of the type in which workpieces, such as screws, washers and the like, are held in a chuck and are operated upon by a tool such as a punch or a power operated screw driver. More particularly, the invention has reference to a machine tool in which the workpieces are delivered by a rotary drum type feeder to a chute and in which the workpieces advance along the chute to the chuck. In such an arrangement, a series of workpieces are disposed in a row in the chute and they are delivered one at a time to the chuck by an escapement mechanism which releases the terminal workpiece while holding the remaining workpieces in the chute.

The principal object of the invention is to provide in a machine tool of the above character a new and improved mechanism for handling workpieces and delivering them to the chuck which mechanism retains positive control over the workpieces as they are delivered to the chuck in order to insure the proper positioning of the work in the chuck and which, as compared to prior arrangements, is simple and compact in construction.

A more detailed object is to employ a novel finger which engages the terminal workpiece, orients the workpiece with respect to the chuck and positively delivers the workpiece to the chuck interior.

Another object is to achieve compactness by providing a novel arrangement of the feeder drum and chute by which the drum turns about a horizontal axis and, at the same time, delivers the workpieces to the chute in a smooth and controlled manner.

The invention also resides in the provision of a novel vibrating spring which receives the workpieces from the drum and vibrates to advance the workpieces to the chute.

Other objects and advantages of the invention will become apparent from the following detailed description taken in connection with the accompanying drawings, in which FIGURE 1 is a fragmentary side elevation of a machine tool employing the novel workpiece handling mechanism of the present invention.

FIG. 2 is an enlarged fragmentary sectional view taken along the line 2—2 in FIG. 1.

FIG. 3 is a perspective view of a spring used as part of the clutch for turning the feeder drum.

FIG. 4 is an enlarged fragmentary side elevation with the parts in a different position and with portions broken away and shown in section.

FIG. 5 is an enlarged fragmentary sectional view taken along the line 5—5 in FIG. 4

FIG. 6 is a fragmentary plan view, parts being broken away and shown in section.

FIG. 7 is an enlarged fragmentary perspective view of the vibrating spring and the chute.

FIG. 8 is an enlarged sectional view taken along the line 8—8 in FIG. 4.

FIGS. 9 and 10 are enlarged views similar to FIG. 8 but showing the parts in different positions.

FIG. 11 is an enlarged fragmentary sectional view taken along the line 11—11 in FIG. 10.

FIG. 12 is a view similar to FIG. 11 but showing the parts in a different position.

For purposes of illustration, the invention is shown embodied in a power operated screw driver in which scerw 15 are delivered from a feeder 16 through a chute 17 to a chuck 18 mounted on the lower end of a tool head 19. The head, the feeder and the chute are secured to an upright column 20 which also supports a suitable work table (not shown) for holding the parts into which the screws are threaded. As is usual in such cases, the chuck 18 is formed by two jaws 21 which are pivotally supported on the head 19 by means of a horizontal pin 22 (FIG. 4) to swing together and apart and are urged yieldably together by a compression spring 23 acting between extensions 24 of the chuck jaws above the pivot pin 22.

As shown in FIGS 4, 9 and 10, opposed notches 25 in the lower end portions of the jaws 21 of the chuck 18 cooperating to form an opening 26 (FIG. 8) alined with the end of the chute 17. Screws 15 are fed one at a time through this opening and down into a vertical bore 27 (FIG. 12) defined by the two chuck jaws, the head of the screw resting on a shoulder 28 when the jaws are together. When a screw is held in this manner by the chuck, the head 19 is lowered toward the work table and a screw driving tool (not shown) is moved down into engagement with the screw. In a manner well known in the art, the jaws are swung apart upon such lowering of the tool to release the screw from the chuck.

Herein, the chute 17 is formed by an elongated bar 29 inclined downwardly from the feeder 16 to the opening 26 in the chuck 18 so that screws 15 advance by gravity toward the chuck. The screws slide in an upwardly opening longitudinal slot 30 (FIG. 5) which is cut in the bar 29 and is enlarged at its upper end as indicated at 31 to form shoulders 32. The screws are disposed in the chute with their shanks projecting down into the slot 30 and their heads resting on the shoulders 32. The top of the chute is covered by a plate 33 which is fastened to the bar 29 and extends from the feeder 16 to a point short of the chuck 18. The row of screws in the chute is held by an escapement mechanism 34 which releases the successive terminal screws one at a time and in timed relation with the raising and lowering of the head 19 so that a screw is delivered to the chuck each time the head is raised.

In accordance with one aspect of the invention, the escapement mechanism 34 is constructed and arranged in a novel manner so that the screws are under positive control as they are delivered to the chuck 18 thereby insuring that they are properly positioned in the bore 27 of the chuck. To this end, the mechanism includes a finger 35 which engages the terminal screw, releases the latter, positively turns the screw so that it parallels the axis of the head 19 and holds the screw in that position as it moves the screw into the chuck and over the bore 27.

In the present instance, the row of screws 15 is held in the slot 30 by a pair of wheels 36 which constitute part of the escapement 34 and which are disposed adjacent the lower end of the chute 17. The wheels are mounted on the bar 29 to turn about parallel axes which extend transversely of the bar and are located on opposite sides of the slot 30 so that their lower ends are generally even with the shoulders 32, the top of the bar 29 being cut away near the chuck 18 as indicated at 37 in FIG. 1 for this purpose.

The wheels 36 are formed with teeth 38 which define semicircular peripheral pockets 39 (FIG. 9). Initially, the wheels are positioned with a tooth on one opposing a tooth on the other so that the terminal screw is held against sliding toward the chuck. By turning the wheels in the directions indicated by the arrows, the head of this screw enters the pockets 39 defined by these and the succeeding teeth. When the latter oppose each other, the terminal screw still is held in the pocket as shown in FIGS. 8 and 10 while the next screw is blocked by the succeeding teeth. When the wheels are turned another step, the first screw is released, the second is in the next pocket 39 and the third is blocked. In order that the wheels 36 retain their angular position between indexing movements, compression springs 40 acting between the wheels and heads 41 (FIG. 11) on the wheel axles 42 press the wheels frictionally against the top of the bar 29.

Preferably, the width of the opening 26 in the chuck 18 when the jaws 21 are completely closed is slightly less than the diameter of the heads of the screws 15 so that the screw released by the wheels 36 slides down the chute 17 and stops against the chuck as shown in FIG. 9. The finger 35 is arranged to engage this screw, turn it to a vertical position, push it forward thereby to force the jaws open and move the screw in above the bore 27, and finally to release the screw which then drops into the bore.

To achieve the foregoing, the finger 35 is an elongated link which projects along and above the bar 29 with its rear end pivotally connected at 42 to the lower end of a generally vertical arm 43. The latter, in turn, is pivotally joined at its upper end to a post 44 upstanding from the bar 29 behind the wheels 36. Adjacent its forward end, the finger curves downwardly and terminates in a short, forwardly projecting lug 45 (FIG. 12). The length of the lug is such that when it engages the shank of the screw, the screw head rests against the finger just above the lug.

Initially, the lower, forward end of the finger 35 is disposed above the row of screws 15 in the chute 17. After the terminal screw has been released by the wheels 36 and has slid down against the chuck 18, the finger is moved forward and drops down into the slot 30 behind the screw which, at that time, is at an angle to the vertical as shown in broken lines in FIG. 11. Upon continued forward movement of the finger, the lug 45 contacts the shank of the screw which thus is turned about its head to the vertical position illustrated.

When the screw 15 is vertical, both its head and its shank are engaged by the finger 35. Further advance of the finger, therefore, moves the screw laterally. This forces the jaws 21 apart against the action of the spring 23 so that the screw enters the chuck 18 as shown in FIG. 12. The finger then is retracted thus releasing the screw which drops into the bore 27.

Advantage is taken of the forward movement of the finger 35 to turn the wheels 36 one step. For this purpose, the finger in its withdrawn position is disposed behind the opposed teeth 38 of the wheels as shown in FIGS. 4 and 9 and rests on top of the pointed end portion 46 (FIG. 10) of the cover plate 33 of the chute 17. In its initial movement forward, the finger engages these teeth and begins to turn the wheels. When the latter have turned slightly to the position shown in FIG. 9, the terminal screw is released and slides to the chuck 18. As the finger continues to move, the wheels turn further until they reach the position shown in FIG. 10. At this time, the finger passes between the teeth and drops down into the slot 30 for engagement with the terminal screw as described above. When retracted, the curved under surface 47 of the finger engages the then opposed teeth 38 and acts as a cam, riding up on these teeth and raising the finger to its starting position.

To move the finger 35 back and forth, an air cylinder 48 is disposed above the bar 29 and generally parallels the latter. The rear end of the cylinder is pivotally connected to a post 49 upstanding from the bar 29 behind the post 44. The rod 49 of the piston 50 projects forwardly and is pivoted to the arm 43 intermediate the ends thereof so that the arm is swung back and forth about its pivot upon sliding of the piston 50 in the cylinder 48. Such swinging of the arm projects and retracts the finger 35.

The present invention also contemplates a novel construction of the feeder 16 which, as compared to prior arrangements, materially reduces the overall space requirements of the machine tool. This construction includes a comparatively narrow drum 51 which turns about a horizontal axis so that it does not extend a substantial distance beyond the planes of the sides of the column 20. The drum is closed at one end by a wall 52 (FIG. 6) and the other end opens into semicircular hopper 53 which is bolted to the back of the column 20. The screws 15 are poured into the hopper and thus into the interior of the drum 51.

To support the drum 51, a stationary horizontal shaft 54 (FIG. 2) has one end projecting into a boss 55 on the side wall of the hopper 53 and extends across the hopper and through the drum along the axis thereof, the shaft being secured to the boss 55 by a set screw 56. Journaled on the shaft are alined sleeves 57 and 57$^a$, the latter being formed with a reduced end portion 58 which projects into the hub 59 of the drum and is joined to the hub by a set screw 60. The sleeve is retained on the shaft by collar 61 received on the reduced end portion 62 of the shaft and held in place by a nut 63 threaded into the shaft.

Preferably, the drum 51 is turned counterclockwise, as viewed in FIG. 1, step by step in timed relation with the movement of the finger 35. For this purpose, the drum is turned by the piston 50 through the medium of an elongated rod 64 which, like the finger, also is pivotally joined at 42 to the lower end of the arm 43 to move back and forth endwise in unison with the finger. The rod extends along the bar 29 above the latter and its rear end is connected to the drum through a one-way clutch so that the drum is turned one step on each forward stroke of the rod and is idle on the return stroke.

Herein, the clutch includes a coil spring 65 wrapped about and overlapping the sleeves 57 and 57$^a$ (see FIG. 2) and received in a peripheral groove 66 in the sleeves. A second sleeve 67 surrounds the sleeves 57 and 57$^a$ and is connected to the sleeve 57 by a set screw 58$^a$ and to the rod 64 by an arm 68 (FIG. 4) which is pivoted at its upper end to a block 69 received on the rod. The spring 65 is wound in such a direction that, as the outer sleeve 67 and the sleeve 57 are turned counterclockwise as seen in FIG. 4, the friction between the sleeve 57 and the spring winds the spring so that it grips the inner sleeve 57$^a$ and turns the latter with the outer sleeve.

Upon the return stroke of the rod 64, the outer sleeve 67 turns in the opposite direction. This unwinds the spring 65 which thereby frees the inner sleeve 57$^a$ so that this sleeve and hence the drum 51 are idle at this time. To prevent backlash during the return stroke of the rod 64, a second spring 70 is disposed between the drum and the stationary collar 61. This spring is coiled in the opposite direction from the spring 65 so that any tendency of the drum to turn back winds the spring 70 and the latter grips the collar and holds the drum stationary.

During the successive steps of the drum 51, screws 15 are carried from the bottom of the hopper 53 up over the chute 17 by buckets 71 which are rigid with and angularly spaced around the inner periphery of the drum. As each bucket approaches its uppermost position as shown in broken lines in FIG. 1, it drops the screws carried thereby.

In accordance with another aspect of the invention, the screws 15 falling from the buckets 71 are delivered to chute 17 by a novel means which advances the screws laterally from the drum 51 to the chute and drops the screws gently and evenly into the slot 30. This means comprises a resilient plate 72 which extends over the bar 29 and in under the buckets 71 and which vibrates upon the impact of the screws dropping on it. Such vibration feeds the screws laterally of the plate 72 and off the edge thereof so that the screws fall from the plate into the slot 30.

As shown in FIG. 7, the plate 72 includes a downwardly projecting side flange 73 which is bolted to the side of the bar 29 to support the plate and an upwardly extending flange 74 on the forward edge to prevent the screws from rolling off the plate before they are vibrated to a notch 75 adjacent the flange 73. When the screws reach the notch, they drop off the plate and into the slot 30. The outer rear corner portion 76 of the plate may, if desired, be bent as shown in FIG. 7 so that the screws fall initially onto a horizontal surface before advancing to the forwardly inclined main portion of the plate.

The buckets 71 usually deliver screws 15 to the chute 17 at a rate faster than required. Excess screws, that is, screws for which there is no room in the slot 30, fall from the plate 72 onto the bar 29 and off of the latter. These screws drop to the bottom of the drum 51 where they are picked up again by the buckets.

While most of the screws 15 dropping from the plate 72 properly position themselves in the slot 30, some may not and, to prevent such screws from jamming the mechanism, means is provided to orient such screws properly or, alternatively, to remove the screws from the chute 17. Herein, this means comprises a wiper 77 which is disposed on top of the bar 29 in advance of the plate 72 and which periodically is moved back and forth along the bar to brush any screws not properly positioned. Such brushing either turns the screws so that their shanks project down into the slot 30 or pushes the screw off the bar 29 and back into the hopper 53.

As shown in the drawings, the wiper 77 may be a flat blade resting on top of the bar 29. Preferably, the blade is moved back toward the plate 72 and forward again once each cycle, that is, once each time the finger 35 loads a screw into the chuck 18. To this end, an arm 78 integral with the blade projects up over and then rearwardly along the rod 64 and the rear end of this arm is fastened to a collar 79 which in turn is secured to the rod. In this way, the blade 77 also is actuated by the piston 50.

To prevent the drive to the drum 51 from being damaged in the event of the drum jamming, the rod 64 is coupled to the arm 68 through a yieldable connection. This connection includes two helical compression springs 80 and 81 encircling the rod 64 and disposed on opposite sides of the block 69. The spring 80 acts between the block and the collar 79 while the spring 81 acts between the block and a collar 82 secured to the rod 64 forwardly of the block. The latter is slidably received on the rod so that the rod moves the block and hence turns the drum 51 through the springs 80 and 81.

From FIG. 6, it will be seen that the chute 17 in extending from the feeder 16 to the chuck 18 passes through the column 20. Proper operation of the workpiece handling mechanism requires that the chute be alined precisely with the opening 26 in the chuck 18. Such alinement is achieved by threading screws 83 through the sides of the hopper to bear against the opposite sides of the bar 29. Thus, by loosening one screw and tightening the other, the bar 29 may be turned slightly until it is centered relative to the chuck.

I claim as my invention:

1. A machine tool for operating on elongated workpieces having, in combination, a support, a head mounted on said support, a chuck supported by said head and comprising two separable jaws having opposed notches to define an opening into the interior of the chuck, means yieldably urging said jaws together, an elongated chute having one end terminating at said opening, said chute supporting a row of workpieces in abutting engagement, mechanism for releasing the terminal workpiece of said row while retaining the remaining workpieces in said chute, said chute being inclined whereby the released workpiece slides toward said chuck, and a finger having an elongated ramming surface substantially parallel to the axis of said chuck and operable to engage a substantial portion of the length of the workpiece first to ram the workpiece against said jaws and aline the workpiece with the chuck and thereafter to ram the workpiece through said opening and into the chuck against the action of said yieldable means.

2. In a machine tool for operating on workpieces, the combination of, a support, a tool head mounted on said support, a chuck supported by said head and having a lateral opening for receiving workpieces, an elongated chute terminating at said opening and operable to deliver workpieces to the interior of said chuck through the opening, said chute supporting a row of workpieces in abutting engagement, a pair of wheels disposed on opposite sides of said chute and having teeth projecting across the row of workpieces in the chute, a tooth on one of said wheels cooperating with an opposed tooth on the other wheel to hold the workpieces in the chute, a finger mounted to move longitudinally of said chute and toward said chuck, said finger first engaging said opposed teeth to turn said wheels thereby to release the terminal workpiece in said row and thereafter to engage said terminal workpiece and advance the same through said opening and into said chuck.

3. In a machine tool for operating on elongated workpieces, the combination of, a support, a tool head mounted on said support, a chuck coaxially supported on said head and having a lateral opening for receiving workpieces, an elongated chute terminating at said opening and operable to deliver workpieces to the interior of said chuck through the opening, said chute supporting a row of workpieces in abutting engagement, an escapement mechanism engaging the terminal workpiece of said row and operable when actuated to release the terminal workpiece while retaining the remaining workpieces of said row, and a finger movable along said chute toward said opening and operable first to actuate said escapement mechanism and release the terminal workpiece, said finger having a ramming surface facing said opening and elongated in the direction of the axis of said chuck to engage the released workpiece along a substantial portion of the length thereof and to insert the workpiece sidewise into the chuck through said opening.

4. In a machine tool for operating on workpieces, the combination of, an elongated chute inclined downwardly and operable to deliver workpieces to the lower end of the chute, a drum mounted alongside the upper end of said chute to turn about a horizontal axis extending transversely of the chute, a hopper disposed adjacent said drum to receive workpieces and deliver the same to the bottom of the drum, a plurality of elements angularly spaced around the drum and mounted on the internal periphery of the drum, means operable to turn said drum whereby said elements pick up workpieces, carry the workpieces to a point above and next to the chute and drop the workpieces, and a generally flat plate disposed in a plane which is at a small angle relative to the horizontal with the lower edge portion of the plate disposed above said chute and the higher portion projecting into said drum to receive workpieces dropped by said elements, said plate being resiliently supported to vibrate under the impact of said workpieces and convey the workpieces laterally over said lower edge portion and onto said chute.

References Cited in the file of this patent

UNITED STATES PATENTS

| | | |
|---|---|---|
| 453,561 | Claflin | June 2, 1891 |
| 738,613 | Holloway | Sept. 8, 1903 |
| 817,780 | Jones | Apr. 17, 1906 |
| 1,126,091 | Sasseman | Jan. 26, 1915 |
| 1,145,774 | Kotkovsky | July 6, 1915 |
| 1,336,785 | Matter et al. | Apr. 13, 1920 |
| 1,839,490 | Moeller | Jan. 5, 1932 |
| 2,261,134 | Blair | Nov. 4, 1941 |
| 2,433,096 | Davis | Dec. 23, 1947 |
| 2,683,531 | Baehr | July 13, 1954 |
| 2,768,594 | Troll | Oct. 30, 1956 |